UNITED STATES PATENT OFFICE.

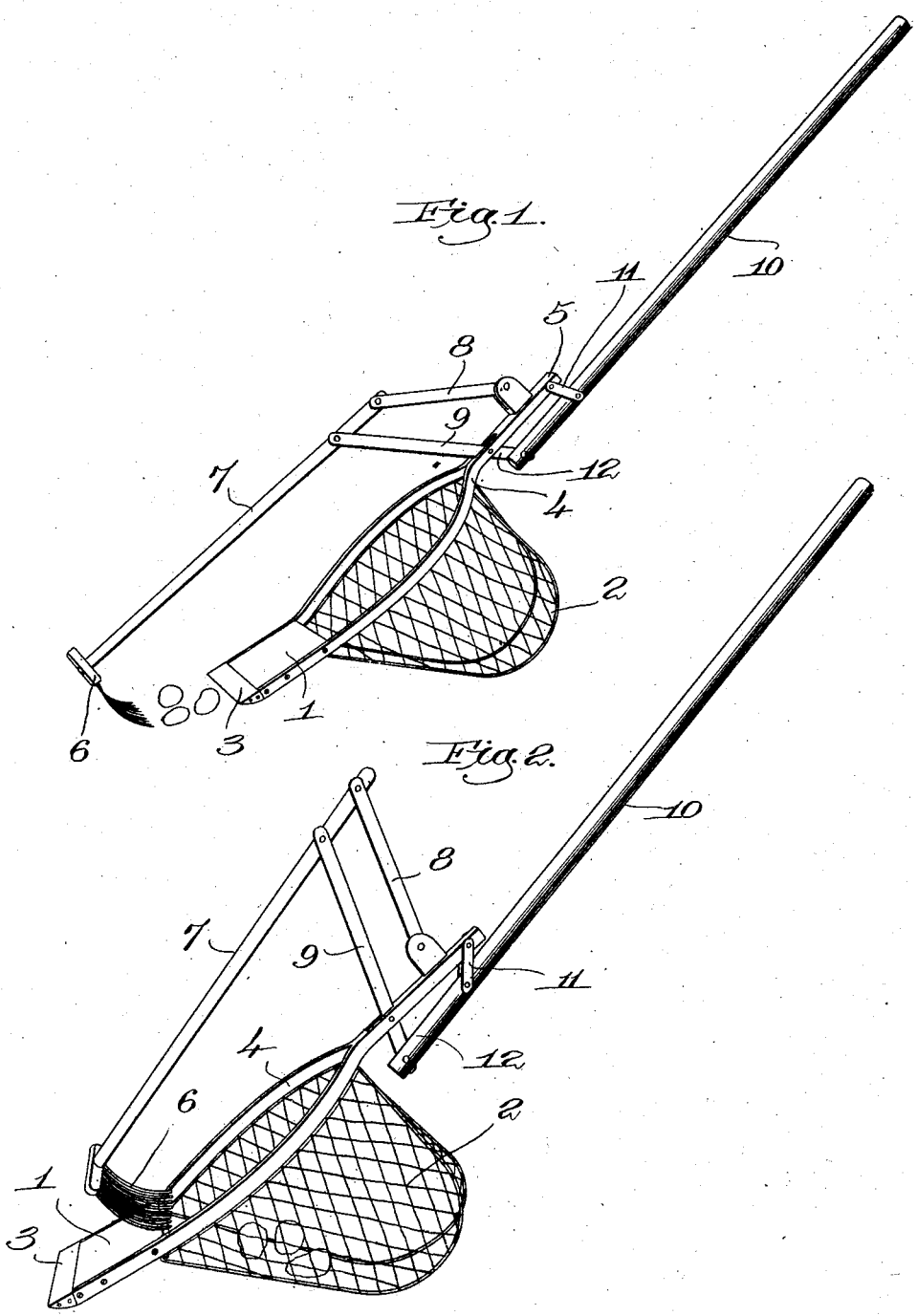

ELMER E. MILLIKEN, OF BRIDGEWATER, MAINE.

POTATO PICK-UP.

973,540.  Specification of Letters Patent.  Patented Oct. 25, 1910.

Application filed April 14, 1910. Serial No. 555,364.

*To all whom it may concern:*

Be it known that I, ELMER E. MILLIKEN, a citizen of the United States, and resident of Bridgewater, county of Aroostook, State of Maine, have invented an Improvement in Potato Pick-Ups, of which the following description, in connection with the accompanying drawing, is a specification, like characters on the drawing representing like parts.

This invention relates to a potato pick-up, and is an improvement upon the invention made the subject matter of my prior application No. 526,933, filed November 8, 1909. As set forth in the said application, it is the object of such a device to pick from the ground potatoes which have been harvested by digging with a machine or by hand.

The present invention provides a device which can be handled with the same facility as that which characterized my previous device, but which also enables the mouth of the scoop to remain entirely unobstructed. It also provides a device of simple and strong structure. In this device the lifter is supported entirely from the rear of the scoop, or that portion opposite the mouth piece so that nothing interferes with the lifting of the potatoes into the scoop, or their discharge therefrom.

The invention will more fully appear from the accompanying description and drawings and will be particularly pointed out in the claims.

The drawings illustrate one form of device embodying the invention.

In the drawings, Figure 1 is a perspective view of the pick-up with the lifter shown in open position and ready for operation to carry potatoes into the scoop; Fig. 2 is a view similar to Fig. 1 after the pick-up has acted and has lifted the potatoes into the scoop.

As in the case of the previous invention, this pick-up comprises essentially a scoop, a lifter, and a handle for the scoop. The scoop as shown comprises a mouth piece 1 and a basket 2. The parts of the scoop may be of any suitable material, but as illustrated the mouth piece 1 is formed of wood with a metal-protected, straight, and fairly sharp edge 3, while the basket as illustrated is formed of a wooden frame-work 4 bent somewhat in the shape of a wish-bone with the two long arms fastened to the sides of the mouth piece 1, and the short arm or plate 5 extending rearwardly, the basket portion proper being formed of wire mesh suitably braced.

The lifter may take any suitable form but as herein illustrated at 6 it is made in the form of a rake. The lifter in performing its function, as in the case of the previous invention, is given its movement toward and from the mouth of the scoop so that when it is in its position away from the mouth of the scoop there is sufficient space between it and the scoop to receive the potatoes lying upon the ground, and as it is moved toward the scoop it lifts or pushes the potatoes into the scoop, but in the present case, the lifter is so mounted and supported that it moves bodily over and substantially parallel to the mouth piece 1, thus lifting or dragging the potatoes completely into the wire basket.

In the form illustrated, the lifter 6 is carried by the lifter arm 7, being connected to the forward end thereof. The lifter arm at its rear end is supported from and mounted on the plate 5 by means of two links 8 and 9. The pivotal connection of the link 8 with the plate 5 is raised somewhat above the pivotal connection of the link 9 with the plate 5, so that when the lifter arm is moved the lifter will have the required movement to enable it to pick up the potatoes on the ground and then push or drag them over the mouth piece into the basket.

As in the case of the previous invention, the movement of the lifter is secured by the scoop handle. This handle is shown at 10 and is connected to the plate 5 to move longitudinally thereof and parallel therewith by means of the link 11 and a downward extension 12 of the link 9. This downward extension 12 of the link 9 constitutes these two elements a lever by means of which the movement of the handle is conveyed directly to the lifter arm 7.

The parts of the pick-up are so proportioned that when the scoop rests on the ground, as shown in Fig. 1, and the handle is retracted to the position there shown, there will be sufficient space between the edge 3 of the scoop and the lifter to allow the scoop to be placed over the potatoes lying upon the ground. When the handle is grasped the parts naturally take this position, the weight of the scoop causing it to move with respect to the handle into this position. The operator after placing the scoop over the potatoes, and in the position shown in Fig. 1, then pushes the handle 10 downwardly toward the scoop, causing the lifter through the levers 9 and 12 to move bodily toward the scoop up over the mouth piece 1 and parallel thereto into the position shown in Fig. 2, and thus lift or throw the potatoes into the scoop. The operation is repeated as often as desired, or until the basket is filled, when the potatoes may be readily dumped into a suitable receptacle.

It will be seen that the lifter arm 7 alone extends above the mouth of the scoop and that this arm is supported entirely from the rear of the scoop and, hence, no obstruction is offered to the placing of the potatoes in, or discharging them from, the scoop.

It is to be understood that the invention is not limited to the particular arrangement and construction illustrated in the drawings, nor otherwise than as set forth in the appended claims.

Having fully described my invention what I claim as new and desire to secure by Letters Patent is:

1. A potato pick-up comprising a scoop, a lifter bodily movable toward and from the mouth of the scoop, a handle for the scoop, and means operated by said handle for moving the lifter bodily toward and from the scoop.

2. A potato pick-up comprising a scoop, a lifter bodily movable toward and from the mouth of the scoop, a lifter arm carrying said lifter at its forward end, the said arm being connected at its rear end to, and solely supported from, the scoop opposite the mouth thereof whereby the mouth of the scoop is entirely unobstructed, save by the lifter and lifter arm.

3. A potato pick-up comprising a scoop, a lifter bodily movable toward and from the mouth of the scoop, a lifter arm carrying said lifter at its forward end, the said arm being connected at its rear end to, and solely supported from, the scoop opposite the mouth thereof whereby the mouth of the scoop is entirely unobstructed, save by the lifter and lifter arm, a handle for the scoop, and means operated by said handle for moving the lifter arm to move the lifter toward and from the scoop.

4. A potato pick-up comprising a scoop, said scoop having a straight edged mouth piece to rest upon the ground, a lifter bodily movable toward and from the mouth of the scoop and substantially parallel to the surface of the said mouth piece, a handle for the scoop, and means operated by said handle for moving the lifter toward and from the scoop.

5. A potato pick-up comprising a scoop having a mouth piece, a plate opposite the mouth piece, a lifter, a lifter arm carrying the lifter at its forward end, connections between the rear end of the lifter arm and the said plate, a handle for the scoop connected to and movable longitudinally of the scoop, and lever connections between the handle and the lifter arm whereby the handle and the lifter will move simultaneously toward and from the scoop.

6. A potato pick-up comprising a scoop having a mouth piece, a plate opposite the mouth piece, a lifter, a lifter arm carrying the lifter, a pair of links connecting the rear end of the lifter arm to the plate, a handle for the scoop movable with respect to said plate, an extension from one of said links pivoted to the handle and constituting with said link a lever whereby the lifter arm is operated by the movement of the handle.

In testimony whereof, I have signed my name to this specification, in the presence of two subscribing witnesses.

ELMER E. MILLIKEN.

Witnesses:
J. E. YORK,
R. C. FORD.